(12) United States Patent
Guo et al.

(10) Patent No.: US 7,804,060 B2
(45) Date of Patent: Sep. 28, 2010

(54) METHOD AND APPARATUS FOR FLUID INFLUX DETECTION WHILE DRILLING

(75) Inventors: Pingjun Guo, Pearland, TX (US); Padmakar Deo, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 696 days.

(21) Appl. No.: 11/610,608

(22) Filed: Dec. 14, 2006

(65) Prior Publication Data

US 2007/0144740 A1 Jun. 28, 2007

Related U.S. Application Data

(60) Provisional application No. 60/750,868, filed on Dec. 16, 2005.

(51) Int. Cl.
*G01V 5/10* (2006.01)
*G01V 5/00* (2006.01)
*E21B 47/00* (2006.01)

(52) U.S. Cl. .................. 250/269.4; 250/258; 166/254.2

(58) Field of Classification Search ................ 250/254, 250/255, 258, 269.1, 269.2, 269.4, 269.6; 166/250.03, 254.2
See application file for complete search history.

(56) References Cited

U.S. PATENT DOCUMENTS

| | | | |
|---|---|---|---|
| 3,521,064 A | 7/1970 | Moran et al. ............... 250/83.3 |
| 4,390,783 A | 6/1983 | Grau ........................ 250/270 |
| 4,394,574 A | 7/1983 | Grau et al. .................. 250/262 |
| 4,399,359 A | 8/1983 | Fertl et al. .................. 250/270 |
| 4,412,130 A | 10/1983 | Winters ...................... 250/260 |
| 4,492,865 A | 1/1985 | Murphy et al. .............. 250/265 |
| 5,045,693 A | 9/1991 | McKeon et al. ............. 250/270 |
| 6,648,083 B2 | 11/2003 | Evans et al. .................. 175/41 |
| 6,768,106 B2 | 7/2004 | Gzara et al. ............... 250/269.3 |
| 7,227,129 B2 * | 6/2007 | Riley et al. ............... 250/269.6 |
| 7,423,258 B2 * | 9/2008 | DiFoggio et al. .......... 250/269.1 |
| 2003/0057366 A1 | 3/2003 | Gzara et al. ............... 250/269.3 |
| 2004/0178337 A1 | 9/2004 | Kurkoski et al. .......... 250/269.4 |
| 2004/0222368 A1* | 11/2004 | Odom et al. .............. 250/269.2 |
| 2006/0180754 A1* | 8/2006 | Edwards et al. .......... 250/269.3 |

OTHER PUBLICATIONS

Weller et al.; "A New Integrated LWD Platform Delivers Improved Drilling Efficiency, Well Placement, and Formation Evaluation Services," SPE 96652, Offshore Europe 2005, Aberdeen, Scotland, U.K., Sep. 6-9, 2005, pp. 1-11.

Stoller et al.; "Field Tests of a Slim Carbon/Oxygen Tool for Reservoir Saturation Monitoring," SPE 25375, SPE Asia Pacific Oil & Gas Conference & Exhibition, Singapore, Feb. 8-10, 1993, pp. 481-487.

(Continued)

*Primary Examiner*—David P Porta
*Assistant Examiner*—Faye Boosalis
(74) *Attorney, Agent, or Firm*—Mossman Kumar & Tyler PC (57) ABSTRACT

A C/O ratio is determined using measurements of inelastically scattered gamma rays with a pulsed neutron source. Combined with look-up tables, the C/O measurement is used as an indicator of formation fluid influx into wellbore such as gas kick.

21 Claims, 4 Drawing Sheets

OTHER PUBLICATIONS

Badruzzaman et al.; Multi-Sensor Through-Casing Density and Saturation Measurement Concepts With a Pulsed Neutron Source: A Modeling Assessment, 2004 SPE International Petroleum Conference in Mexico, Puebla, Mexico, Nov. 8-9, 2004, pp. 1-14.

Thatcher et al.: *Integration of Coiled Tubing Underbalanced Drilling Services to Improve Efficiency and ValSP,E* 60708, 2000 SPE/CoTA Coiled Tubing Roundtable, Houston, Texas, Apr. 5-8, 2000, pp. 1-9.

* cited by examiner

METHOD AND APPARATUS FOR FLUID INFLUX DETECTION WHILE DRILLING

CROSS-REFERENCES TO RELATED APPLICATIONS

This application claims priority from U.S. Provisional Patent Application Ser. No. 60/750,868 filed on 16 Dec. 2005.

BACKGROUND OF THE INVENTION

This invention relates generally to oil and gas well logging tools. More particularly, this invention relates tools and methods for identifying the influx of formation fluids such as gas, oil, or water, into the borehole in real-time during drilling operations.

Exploration for hydrocarbons commonly includes using a bottomhole assembly including a drill-bit for drilling a borehole in an earth formation. Drilling fluid or "mud" used in the drilling may vary in density or "mud weight" for a number of reasons. Such variations can result from changes in the quantity and density of cuttings (particles of formation); changes in the "mud program" at the surface, changes in temperature, etc. Variations in mud density also occur when gas or liquid enter the borehole from the formation. Such influx of formation fluids may likely be the result of formation overpressures or abnormally high pressures.

Pressure detection concepts are especially important in drilling. Not only does the drilling rate decrease with a high overbalance of mud pressure versus formation pressure, but also lost circulation and differential pressure sticking of the drill pipe can readily occur. More importantly, an underbalance of mud pressure versus formation pressure can cause a pressure "kick." A well may kick without forewarning. Balanced drilling techniques often require only a fine margin between effective pressure control and a threatened blowout. Additionally, there are situations where underbalance is maintained to avoid formation damage so that it is important to detect inflow of formation liquids into the borehole.

Some prior art techniques for detecting abnormal formation pressure are based on measurement of drilling parameters such as drilling rate, torque and drag; drilling mud parameters such as mud gas cuttings, flow line mud weight, pressure kicks, flow line temperature, pit level and pit volume, mud flow rate; shale cutting parameters such as bulk density, shale factor, volume and size of cuttings. All of these suffer from the drawback that the measurements are not available in real-time.

Other prior art methods for identifying possible kicks rely on density measurements of the borehole fluid. See, for example, U.S. Pat. No. 4,492,865 to Murphy et al, U.S. Pat. No. 4,412,130 to Winters, U.S. Pat. No. 6,648,083 to Evans et al., and U.S. Pat. No. 6,768,106 to Gzara et al. A drawback of methods that make density measurements is that gas must be present in sufficient quantities to affect the density of the mud, so that dissolved gas that may be a precursor to a gas kick would not register with density measuring devices. In addition, the density measurements made by the prior art devices are responsive to varying degrees to the density of the formation.

There is a need for a technique to measure the properties of the borehole fluid downhole with a single tool in order to detect kicks and inflow of formation liquids. The present invention satisfies this need.

SUMMARY OF THE INVENTION

One embodiment of the present invention is a method of identifying and quantifying a gas kick during drilling of a wellbore. Measurements are made at at least one detector of inelastically scattered gamma rays resulting from activation of a pulsed neutron source. From the measurements, a carbon to oxygen ratio (C/O ratio) is determined. This ratio is indicative of possible gas kicks during drilling. Measurements may be made with more than one detector to correct for the effect of the formation. When more than one detector is used, other parameters such as formation density, formation porosity and formation composition may be determined using a combination of inelastic and capture gamma rays. The gas kick indicator is available in real time and may be telemetered uphole for appropriate remedial action, such as adjusting mud weight. In addition to or instead of the C/O analysis, an elemental analysis of the borehole fluid may be done to identify the influx of formation liquids into the borehole.

Another embodiment of the invention is an apparatus that includes a pulsed neutron source. A near detector makes measurements of gamma rays that are primarily responsive to the borehole fluid. A processor estimates from the measured gamma rays a C/O ratio. The processor further determines from the estimated C/O ratio and stored look-up tables a gas kick indicator. The apparatus may include more than one detector, in which case, the processor can estimate properties of the formation such as porosity, density and elemental composition. The processor may also use an elemental analysis of the borehole mud in addition to or instead of the C/O analysis to identify the inflow of formation liquids into the borehole.

Another embodiment of the invention is a machine readable medium for use with an apparatus for evaluating an earth formation. The apparatus includes a source of neutrons conveyed in a borehole in the earth formation, the source irradiating the earth formation. At least one detector spaced apart from the source produces signals indicative of results of interaction of the radiation with nuclei in the earth formation. The medium includes instructions which enable a processor to estimate from the signals a value of a C/O ratio and a gas kick indicator. The medium may be a ROM, an EPROM, an EEPROM, a Flash Memory, and/or an optical disk.

BRIEF DESCRIPTION OF THE FIGURES

The present invention is best understood with reference to the accompanying figures in which like numerals refer to like elements and in which.

DETAILED DESCRIPTION OF THE PREFERRED EMBODIMENTS

Figure 1:
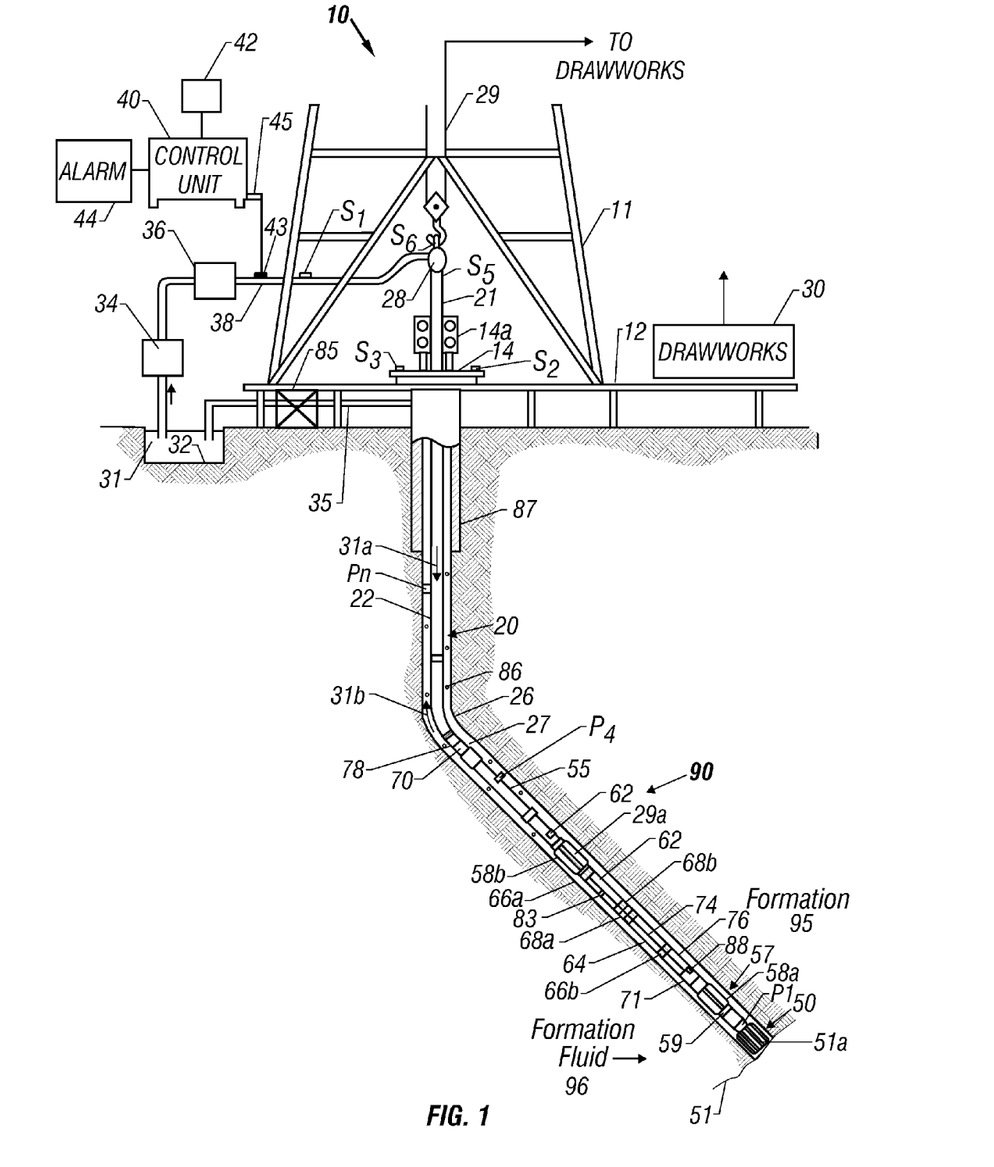
FIG. 1 shows a schematic diagram of a drilling system that includes the apparatus of the current invention in a measurement-while-drilling embodiment.

The present invention is described with reference to a drilling assembly, although many of the methods of the present invention are also applicable with logging tools conveyed on a wireline and may also be used in cased boreholes. FIG. 1 shows a schematic diagram of an exemplary drilling system 10 such as that disclosed by Estes. The drilling system has a bottom hole assembly (BHA) or drilling assembly 90 that includes gyroscope. For some of the applications of the present invention, a gyroscope is not essential. The BHA 90 is conveyed in a borehole 26. The drilling system 10 includes a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations when it is rotated to drill the borehole 26. The drill string 20 is coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used as instead of the rotary table 14 to inject the BHA into the wellbore when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid passes from the mud pump 34 into the drill string 20 via a desurger 36 and the fluid line 38. The drilling fluid 31 discharges at the borehole bottom 51 through openings in the drill bit 50. The drilling fluid 31 circulates uphole though the annular space 27 between the drill string 20 and the borehole 26 and returns to the mud pit 32 via a return line 35 and drill cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications the drill bit 50 is rotated by only rotating the drill pipe 22. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied weight on bit. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$-$S_6$ and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 contains a computer, memory for storing data, recorder for recording data and other peripherals. The surface control unit 40 also includes a simulation model and processes data according to programmed instructions. The control unit 40 is preferably adapted to activate alarms 44 when certain unsafe or undesirable operating conditions occur.

The BHA may also contain formation evaluation sensors or devices for determining resistivity, density and porosity of the formations surrounding the BHA. The present invention also includes a sensor which is useful for determining the composition of the borehole fluid as discussed below. A gamma ray device for measuring the gamma ray intensity and other nuclear and non-nuclear devices used as measurement-while-drilling devices are suitably included in the BHA 90. As an example, FIG. 1 shows a resistivity measuring device 64. It provides signals from which resistivity of the formation near or in front of the drill bit 50 is determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole computer 70 to determine the resistivity and dielectric values.

An inclinometer 74 and a gamma ray device 76 may be suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, position sensors, such as accelerometers, magnetometers or gyroscopic devices may be disposed in the BHA to determine the drill string azimuth, true coordinates and direction in the wellbore 26. Such devices are known in the art and are not described in detail herein.

In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. Such devices are known in the art and are thus not described in any detail.

As noted earlier, a large portion of the current drilling systems, especially for drilling highly deviated and horizontal wellbores, utilize coiled-tubing for conveying the drilling assembly downhole. In such application a thruster 71 is deployed in the drill string 90 to provide the required force on the drill bit. For the purpose of this invention, the term weight on bit is used to denote the force on the bit applied to the drill bit during the drilling operation, whether applied by adjusting the weight of the drill string or by thrusters. Also, when coiled-tubing is utilized the tubing is not rotated by a rotary table, instead it is injected into the wellbore by a suitable injector 14a while the downhole motor 55 rotates the drill bit 50.

Figure 2:
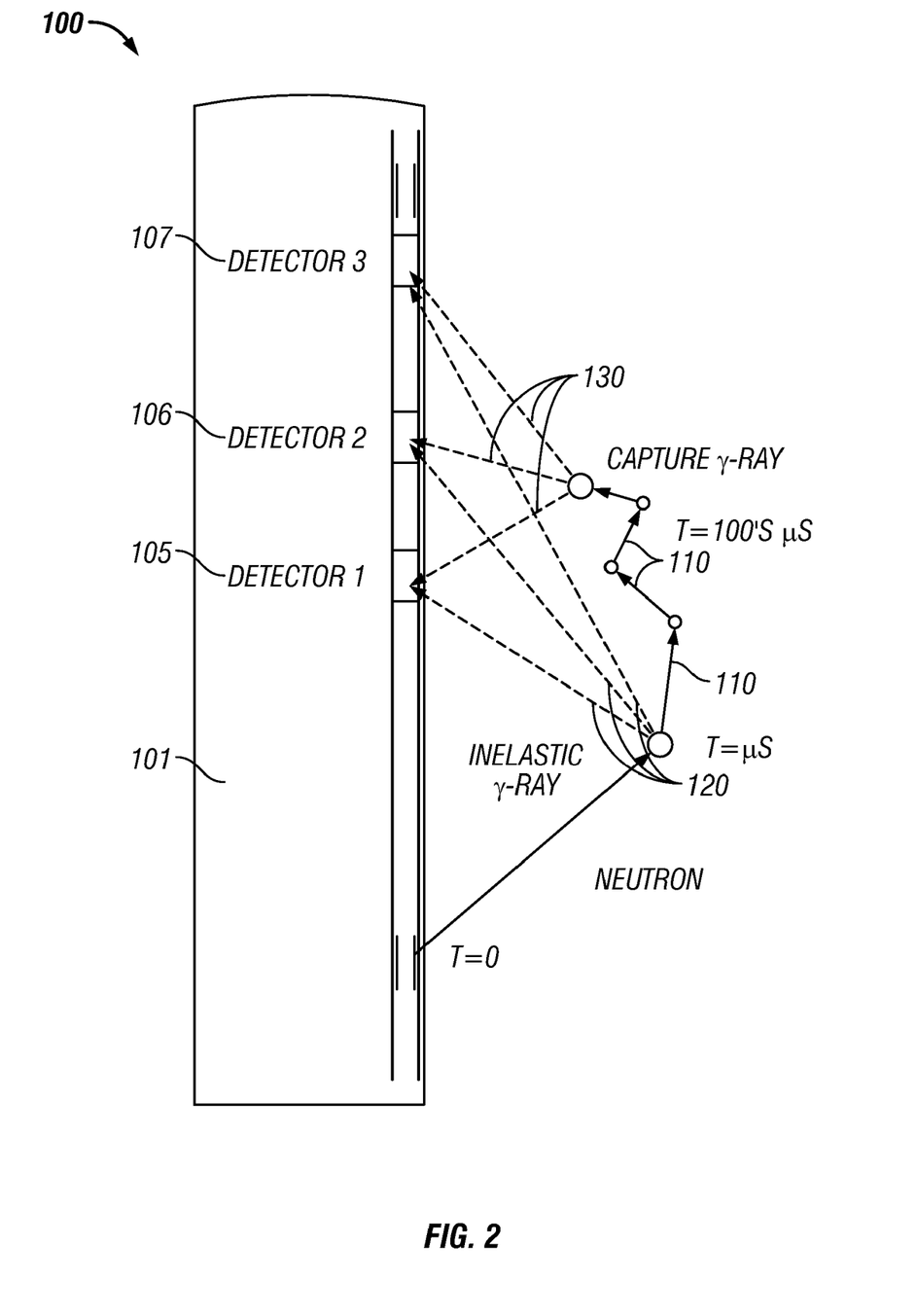
FIG. 2 illustrates the generation of gamma rays by inelastic scattering, and by capture of thermal and epithermal neutrons.

FIG. 2 shows an illustration of the logging tool suitable for use with the present invention. The apparatus illustrated is that of the Reservoir Performance Monitor (RPM) of Baker Atlas, Incorporated. The typical operation of the tool as used for determination of formation properties is described. Included are comments specific to the determination of properties of the mud.

A measurement device 100 comprises a neutron source 101 and three axially spaced apart detectors described below. The number of detectors shown in the embodiment of FIG. 2 is only an example of the number of detectors employed in an embodiment of the present invention. It is not a limitation on the scope of the present invention. The measurement device may comprise two or more detectors. The neutron source 101 may be pulsed at different frequencies and modes for different types of measurements. The short-spaced (SS) detector 105 is closest to the source 101 The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (μs), before they lose much energy, some neutrons are involved in inelastic scattering with nuclei in the borehole and formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors may be employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, the instrument pulses at 10 kHz, for example, and records full inelastic and capture gamma ray energy spectra from each detector. These data are processed to determine elemental ratios including carbon/oxygen and calcium/silicon from the inelastic spectra and silicon/calcium from the capture spectra.

In an embodiment of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

After just a few μs, most of the neutrons are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few μs after the neutron generator shuts off, the process of thermalization is complete. Over the next several hundred μs, thermal neutrons are captured by nuclei of various elements—again producing gamma rays, known as capture gamma rays 130. A capture gamma ray energy spectrum yields information about the relative abundances of these elements. The inelastic gamma rays are depicted by 120.

For the purposes of the present invention, it is usually sufficient to measure the inelastically scattered gamma rays from the mud. Accordingly, for the limited purposes of the present invention, it may be sufficient to use measurements from only the SS detector. Measurements from the other detector(s) would still be needed for determination of formation properties.

One embodiment of the invention measures the Carbon/Oxygen (C/O) ratio from the inelastic gamma rays. As would be known to those versed in the art, the inelastic gamma rays scattered at an energy of about 4.4 MeV are primarily due to carbon nuclei in the formation. The inelastic gamma rays scattered at an energy of about 6.13 MeV are indicative of oxygen nuclei in the formation. These ranges are depicted by the windows 151 and 153 in FIG. 3. The inelastic gamma ray spectrum shown therein is obtained in a water filled limestone formation. This, and similar data for other reservoir rocks, is the basis for the method of the present invention.

Figure 3:
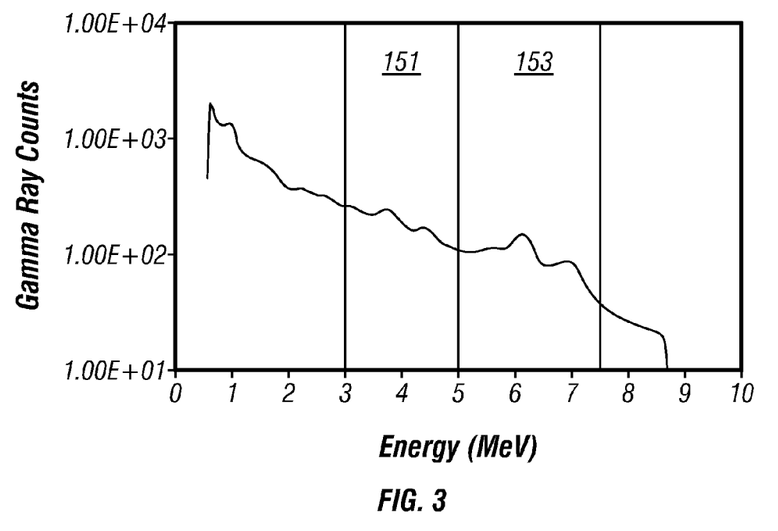
FIG. 3 is an exemplary plot of an inelastic gamma ray spectrum obtained in water-filled limestone formation and carbon and oxygen windows which may be used to compute the C/O ratio.

In one embodiment of the invention, the observed spectra are fit by a weighted combination of standard spectra (for Carbon and Oxygen in the present case). The weights give the relative abundance of Carbon and Oxygen (the C/O ratio). Such an approach has been discussed, for example, in U.S. Pat. No. 3,521,064 to Moran et al. In another embodiment of the invention, a window base technique is used in which the C/O ratio is given by the ratio of the counts in the windows such as 151 and 153.

Prior art methods, such as those described in U.S. Pat. No. 5,045,693 to McKeon et al. determine the C/O ratio for different detectors and then correct for the effect of the borehole fluid to determine formation properties. Specifically, McKeon teaches the determination of water saturation (or oil saturation) of the formation.

In the present invention, the borehole signal is the desired signal rather than noise to be removed. Accordingly, the C/O ratio determined from the SS detector may be used as a gas kick indicator. Optionally, the C/O ratio determined from the SS and LS detectors may be processed to remove the effect of the formation and enhance the borehole signal.

Figure 4A:
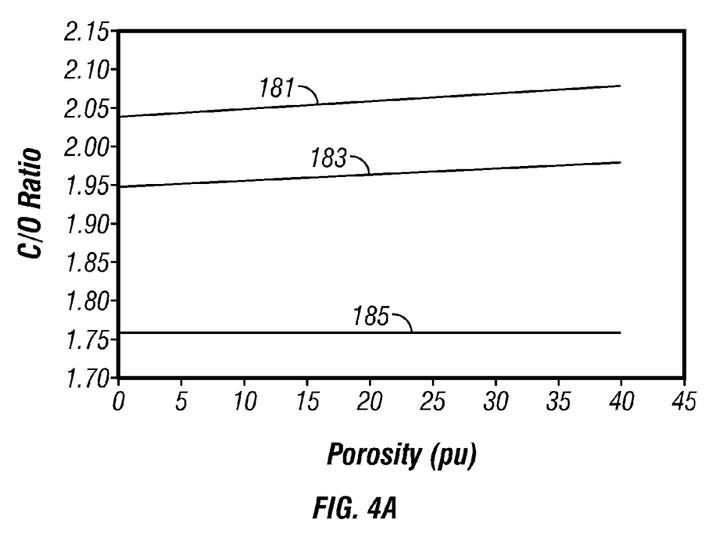
FIG. 4a shows an exemplary plot of the C/O ratio for a borehole filled with oil, gas and water in a water-saturated sandstone.
Figure 4B:
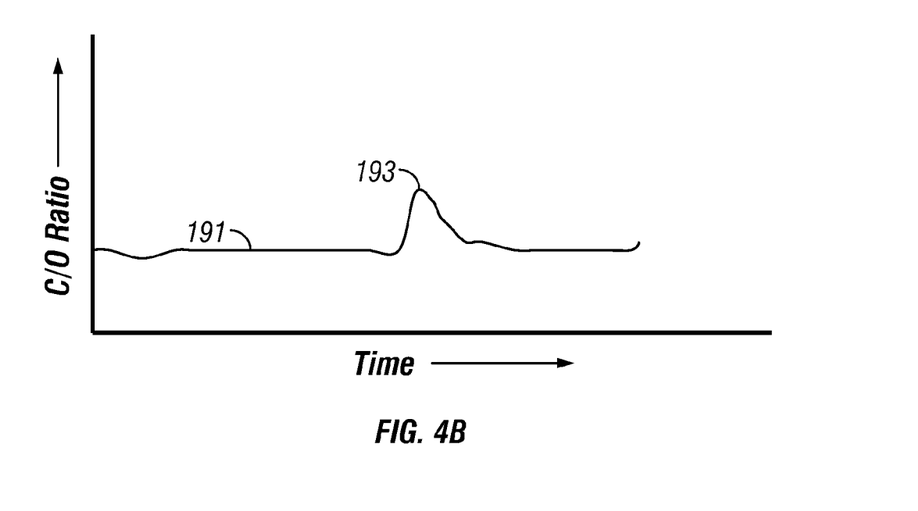
FIG. 4b schematically depicts the manifestation of a gas kick on the measured C/O ratio.

FIG. 4a shows plots of the C/O ratio (ordinate) as a function of formation porosity (abscissa). The curves are obtained using a Monte Carlo simulation for a water-saturated sandstone. The curve 181 is the C/O ratio when the borehole is filled with oil, the curve 183 is for a gas-filled borehole while the curve 185 is for a water-filled borehole. It will thus be evident that if the C/O measurements are made during drilling where a water based mud (WBM) is used, the measured C/O ratio would be close to 1.75, the value for a water-filled borehole. This is denoted by 191 in FIG. 4b. Note that the abscissa in FIG. 4b is time while the ordinate is the measured C/O ratio. If there is a gas kick, then there will be an increase in the amount of gas in the borehole which results in an increase in the C/O ratio denoted by 193. It would be apparent that this effect would be noted even if the gas influx remains in solution. This is in contrast to prior art methods that measure fluid density as a kick indicator—dissolved gas would have practically no effect on the density of the borehole fluid. Given such a kick indication, appropriate remedial action could be taken, such as increasing the mud weight so as to maintain the proper balance in drilling conditions.

It should also be noted that with the three curves of FIG. 4a, a sudden influx of oil into the borehole would also be detected by measuring the C/O ratio, and for a given influx of formation fluid, the effect would be greater for oil than for gas.

It would be apparent to those versed in the art that if an oil-based mud (OBM) is used for drilling, the picture reverses, i.e., a gas kick would lead to a decrease in the C/O ratio from the C/O value for an oil filled borehole. A sudden influx of water into the borehole would have an even greater effect.

Figure 5:
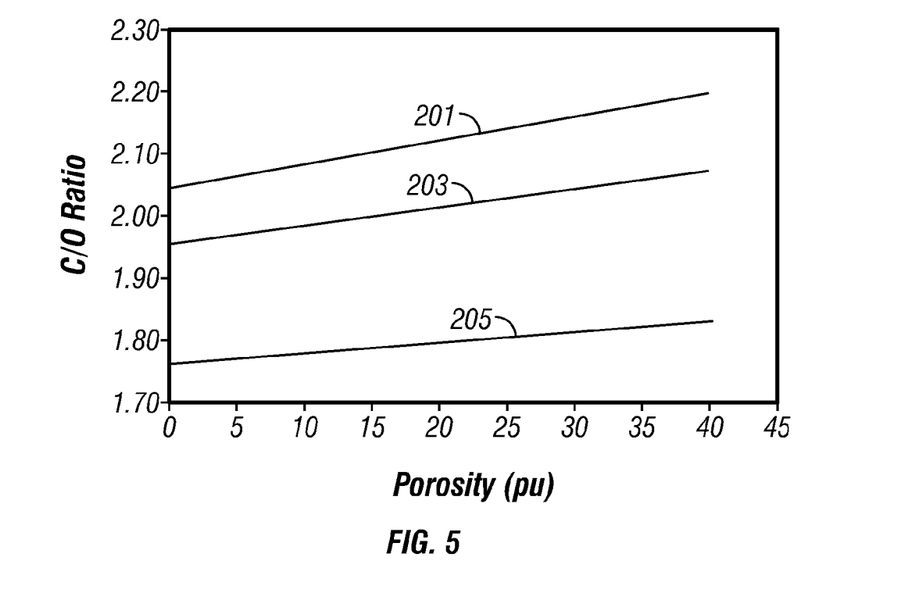
FIG. 5 shows an exemplary plot of the CIO ratio for a borehole filled with oil, gas and water in an oil-saturated sandstone.

FIG. 5 shows curves similar to those of FIG. 4a but for an oil-filled sandstone formation. The curves 201, 203 and 205 correspond to an oil-filled borehole, a gas-filled borehole, and a water-filled borehole respectively. Here, the expected effects would be similar to those for water-filled sandstone, but there is more of a dependence on the formation porosity, The C/O gas measurement system can be run in standalone mode or in integrated mode with other LWD sensors and instruments where the pulsed neutron source would also provide neutrons for additional measurements such as neutron porosity, bulk density, formation sigma and elemental analysis. The system can acquire and send data in continuous logging and drilling mode as well as stationary logging mode. If possible, the stationary mode would be preferred for gas influx detection as it stops the drilling operation momentarily and allows well to flow in the depth interval of interest to record and process the C/O data. Look-up tables (with the information such as that in FIG. 4a and 5 corresponding to different lithologies, formation fluids, borehole fluids and borehole diameters are stored in the memory of the downhole processor. These look-up tables are used with the C/O measurement as a kick indicator. Most of the measurements made by the other LWD sensors could be stored for later retrieval. The gas influx indicator, however, should usually be telemetered uphole for remedial action by the drilling operator. As an alternative to a look-up table, a trained neural net may be used.

The method described above for determination of a gas kick during drilling may also be used for identifying and quantifying the influx of other fluids into the borehole during drilling. Such an influx can be particularly problematic in underbalanced drilling wherein the mud weight is maintained below the expected formation fluid pressure to avoid possible formation damage. U.S. patent application Ser. No. 10/191, 152 of Fontana et al. describes a system for controlling the equivalent circulating density during drilling of wellbores. Either coiled tubing or drill pipes are used in the drilling. Small quantities of formation liquids into the borehole may not have much of an effect on the C/O ratio. However, with underbalanced drilling, the difference between the formation fluid pressure and the borehole pressure may lead to sufficient influx of formation liquid as to affect the C/O ratio, so a more complete elemental analysis may not be needed.

In an alternate embodiment of the invention, an elemental analysis of the fluid in the annulus between the bottomhole assembly and the borehole wall is carried out. The basic principles of such elemental analysis as applied to formation analysis are well known in the art. In prior art, the measured spectrum is analyzed by comparing it with a composite spectrum made up of standard spectra of constituents postulated to comprise the formation. As a result of such analysis, the proportions of the postulated constituents in the formation are determined. See, for example, U.S. Pat. No. 4,394,574 and U.S. Pat. No. 4,390,783 to Grau. In the present invention, the elemental analysis method is applied to the borehole fluid. The method described above for CIO ratio is carried out except that analysis is carried out for more elements. The composition of the mud coming down the drilling tubular is known, so that its spectrum is also a known quantity. If the spectrum of the fluid in the annulus is different, then it is an indication of influx of formation liquids into the borehole. By the elemental analysis, an estimate can be made of the fraction of the fluid in the annulus that consists of formation liquid.

The effects of liquid influx into the borehole are particularly noticeable when air drilling is used. With air drilling, C/O ratio determination gives a good indication of fluid influx into the borehole. SPE 60708 of Thatcher et al. discloses a methodology of air drilling using a motor conveyed on coil tubing. The nuclear sensor assembly of the type discussed above can be part of a BHA which includes an air motor.

The processing of the measurements made in MWD applications is preferably done by a downhole processor. For wireline applications, the processing may be done either downhole, at the surface or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks. The term processor is intended to include devices such as a field programmable gate array (FPGA).

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of detecting a presence of a second fluid from an earth formation into a borehole containing a first fluid, the method comprising:
    (a) conveying a logging tool into the borehole;
    (b) irradiating the earth formation with a source thereof on the logging tool;
    (c) measuring radiation resulting from interaction of the irradiation with nuclei in the borehole at least one detector;
    (d) determining from the measured radiation a change in an elemental composition of the first fluid; and
    (e) using the determined change in elemental composition as an indicator of the presence of the second fluid in the borehole.

2. The method of claim 1 wherein irradiating the earth formation further comprises using a pulsed neutron source.

3. The method of claim 1 wherein measuring the radiation further comprises measuring inelastic gamma rays.

4. The method of claim 3 wherein determining the change in the elemental composition further comprises estimating a C/O ratio from the measured radiation.

5. The method of claim 4 wherein estimating the presence of the second fluid further comprises detecting a change in the C/O ratio.

6. The method of claim 4, further comprising using the estimated C/O ratio to determine a gas kick indicator.

7. The method of claim 1 wherein the first fluid is selected from the group consisting of: (i) a water-based mud, and (ii) an oil-based mud.

8. The method of claim 1 wherein the second fluid is selected from the group consisting of: (i) water, (ii) oil, and (iii) gas.

9. The method of claim 1 further comprising:
(i) measuring additional radiation resulting from interaction of the irradiation with nuclei in the earth formation at at least one additional detector, and
(ii) estimating from the measured radiation and the measured additional radiation at least one of: (A) a formation density, (B) a formation porosity, and (C) a formation composition.

10. The method of claim 1 further comprising conveying the logging tool into the borehole on a conveyance device selected from: (i) a wireline, (ii) a slickline, (iii) coiled tubing, and (iv) a drilling tubular.

11. An apparatus for detecting a presence of a second fluid from an earth formation into a borehole containing a first fluid, the apparatus comprising:
(a) a logging tool configured to be conveyed into the borehole;
(b) a source of the radiation on the logging tool configured to irradiate the earth formation;
(c) at least one detector on the logging tool configured to measure radiation resulting from interaction of the irradiation with nuclei in the borehole; and
(d) a processor configured to:
(A) estimate a change in an elemental composition of the first fluid using the measured radiation, and
(B) use the change in the elemental composition as an indicator of the presence of the second fluid in the borehole.

12. The apparatus of claim 11 wherein source of radiation further comprises a pulsed neutron source.

13. The apparatus of claim 11 wherein the at least one detector is further configured to measure inelastic gamma rays.

14. The apparatus of claim 13 wherein the processor is further configured to estimate the change in the elemental composition by estimating a C/O ratio from the measured radiation.

15. The apparatus of claim 14 wherein the processor is further configured to estimate the presence of the second fluid by detecting a change in the C/O ratio.

16. The apparatus of claim 11 wherein the first fluid is selected from the group consisting of: (i) a water-based mud, and (ii) an oil-based mud.

17. The apparatus of claim 11 wherein the second fluid is selected from the group consisting of: (i) water, (ii) oil, and (iii) gas.

18. The apparatus of claim 11 further comprising:
(i) at least one additional detector configured to measure additional radiation resulting from interaction of the irradiation with nuclei in the earth formation, and
wherein the processor is further configured to estimate from the measured radiation and the measured additional radiation at least one of: (i) a formation density, (ii) a formation porosity, and (iii) a formation composition.

19. The apparatus of claim 11 further comprising a conveyance device selected from: (i) a wireline, (ii) a slickline, (iii) coiled tubing, and (iv) a drilling tubular.

20. A computer-readable medium product accessible to at least one processor, the computer-readable medium including instructions which enable the at least one processor to:
estimate a change in an elemental composition of a first fluid in a borehole using measured radiation resulting from interaction of radiation from a radiation source on a logging tool conveyed in the borehole to irradiate an earth formation with nuclei in the borehole, and
use the estimated change in the elemental composition as an indicator of a presence of a second fluid in the borehole.

21. The medium of claim 20 further comprising at least one of: (i) a ROM, (ii) an EPROM, (iii) an EEPROM, (iv) a flash memory, and (v) an optical disk.

\* \* \* \* \*